United States Patent [19]

Eames

[11] Patent Number: 5,301,057
[45] Date of Patent: Apr. 5, 1994

[54] SUBSCRIBER INTERFACE FOR A FIBER OPTIC COMMUNICATIONS TERMINAL

[75] Inventor: Thomas R. Eames, Santa Rosa, Calif.

[73] Assignee: DSC Communications Corporation, Plano, Tex.

[21] Appl. No.: 597,061

[22] Filed: Oct. 15, 1990

[51] Int. Cl.$^5$ ............................................. H04B 10/00
[52] U.S. Cl. ..................................... 359/163; 370/67; 370/85.9
[58] Field of Search ............... 439/631, 638, 217, 218, 439/49, 52, 53; 350/962; 455/600, 612; 370/67, 84, 85.1, 85.9, 112, 85.11; 359/163, 117, 118, 135, 137

[56] References Cited

U.S. PATENT DOCUMENTS

| | | | |
|---|---|---|---|
| 3,760,328 | 9/1973 | Georgopulos | 439/49 |
| 4,468,765 | 8/1984 | Hensel et al. | 359/135 |
| 4,612,670 | 9/1986 | Henderson | 359/169 |
| 4,787,081 | 11/1988 | Waters et al. | 370/67 |
| 4,823,403 | 4/1989 | Twietmeyer | 359/163 |
| 4,908,823 | 3/1990 | Haagens et al. | 359/158 |

FOREIGN PATENT DOCUMENTS

| | | |
|---|---|---|
| 0231630 | 8/1987 | European Pat. Off. |
| 0186437 | 10/1984 | Japan ................................... 359/163 |
| 2213024A | 8/1989 | United Kingdom |
| 2215943A | 9/1989 | United Kingdom |

Primary Examiner—Richard E. Chilcot, Jr.
Assistant Examiner—Rafael Bacares
Attorney, Agent, or Firm—Maajestic, Parsons, Siebert & Hsue

[57] ABSTRACT

A terminal for interconnecting a large number of subscriber telephone circuits with a large bandwidth fiber optic transmission system. A system backplane includes a large number of connectors that each can receive a subscriber printed circuit card which is connectable to subscriber telephone equipment. Each connector is connected to several separate communication buses that each carry a number of communication channels from the fiber optic system, but a primary bus position of each connector is connected to a single, unique bus. This allows each card to have a dedicated bus for up to the number of communication channels of the bus, with additional channel capacity available from primary buses of other connectors, if necessary.

19 Claims, 2 Drawing Sheets

SUBSCRIBER INTERFACE FOR A FIBER OPTIC COMMUNICATIONS TERMINAL

BACKGROUND OF THE INVENTION

This invention relates generally to a telephone communications terminal, and more specifically, to a terminal adapted to interconnect a large number of telephone circuits of various types with a high bandwidth communication link.

In cases where a large number of individual telephone channels need to be provided between two geographical locations, it is common to multiplex a number of such channels on a single wide bandwidth circuit that extends between the locations. Multiplexing equipment is then provided at each location. This is done primarily to reduce the cost of providing transmission link for a large number of channels between the two locations.

An example is a loop carrier system provided between a large telephone company central office and a concentration of individual telephone subscribers located at least several miles away. A high bandwidth communications circuit is provided from the central office to the customer location, with a multiplexing terminal at each end. The use of a fiber optic transmission media between the terminals has an advantage over the use of a single electrical circuit in its greater bandwidth; that is, optical fiber systems can carry a much greater number of individual telephone channels. The channels are time multiplexed onto a single optical fiber transmission medium by providing repetitive time slots in sequence that are dedicated to each channel. Each terminal, therefore, provides for inserting signals from each channel being transmitted into its unique fiber optic time slot, and directs each received time slot to the correct individual telephone circuit. Each terminal includes a time slot interchanger that allows control of which end user telephone channels are assigned to which time slots in the fiber optic transmission system.

Each such terminal must be capable of interconnecting with any one of several standard types of end user telephone circuits. A most common type is a circuit carrying a single telephone channel which is connected to a standard telephone instrument, computer terminal modem, and the like. Another common circuit, long designated as a T1 carrier system, carries 24 individual telephone channels. The T1 circuit eventually terminates each of its channels with a telephone subscriber. Since such systems are already widely in use, it is necessary to be able to connect them with the fiber optic trunk line. Other standards providing 12, 48 and 96 channels on a single wired telephone circuit also exist and must be connectable to such a communications terminal.

Therefore, it is a primary object of the present invention to provide a terminal system and components thereof that provides an ability for easily accommodating any of a wide variety of existing telephone subscriber circuits while utilizing the full bandwidth capability of the system.

SUMMARY OF THE INVENTION

This and additional objects are accomplished by the present invention wherein, briefly and generally, a communications terminal adapted to be connected with a trunk having a wide bandwidth for accommodating a large number of individual communication channels is provided with a backplane of a large number of identical circuit card slot connectors which accommodate any of several types of circuit cards that are specifically designed to interface with the various types of subscriber (customer) wired telephone circuits, some of which are discussed above. A large number of buses interconnect the card connectors with a terminal control system and time slot interchanger. Each connector includes a primary set of conductors in a given position, and one or more sets of secondary conductors. The primary set of conductors of each backplane connector is connected with a unique one of the buses. Each bus is also connected with a secondary set of conductors of at least one other circuit card connector.

Each circuit card adapted to be received by the card slot provides connection with at least its primary set of conductors. Each card may use up to the maximum number of communication channels provided on a single bus through that interconnection. The capacity of the buses is made large enough to include the channel capacity of the most common subscriber telephone circuits. But for those situations where additional channels are required, the circuit card for that application additionally interconnects with one or more secondary sets of conductors in order to use any available channel capacity on the buses connected to them. Circuit cards are specifically designed for interfacing with a particular type of customer telephone circuit, and uniquely take advantage of the bandwidth provided at each of the card slots connectors.

Additional objects, advantages and features of the various aspects of the present invention will become apparent from the following description of a preferred embodiment thereof, which description should be taken in conjunction with the accompanying drawings.

DESCRIPTION OF A PREFERRED EMBODIMENT

Figure 1:
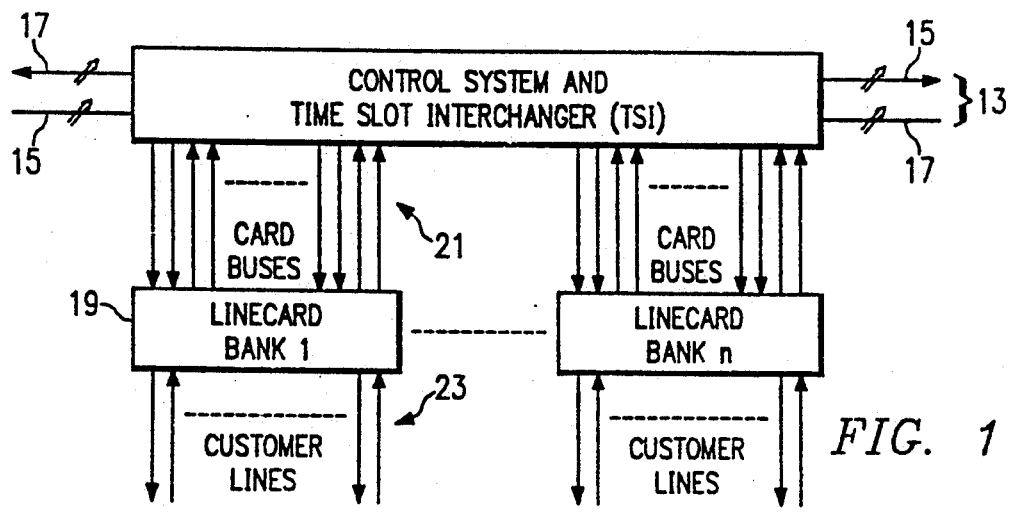
FIG. 1 illustrates in block diagram form a terminal which utilizes various aspects of the present invention.

Referring initially to FIG. 1, a telephone communications terminal is generally illustrated with a control system and time slot interchanger 11 being interconnected with a fiber optic trunk line 13. In the example illustrated, the trunk 13 includes a first fiber optic communication medium 15 which carries signals in one direction along the trunk, and a second fiber optic communication medium 17 which carries signals in an opposite direction. The terminal control system 11 is adapted to receive from and transmit into each of the fiber optic communication paths 15 and 17. Alternatively, the fiber optic paths 15 and 17 could be terminated in the control system 11, rather than passing by it and onto another like system, but this does not affect the architecture or features of the terminal to be described.

The central part 11 of the terminal is interconnected with a plurality of line card banks, such as bank 19, by a plurality of electrical buses 21. As explained more fully below, the various buses 21 are connected to circuit card slot connectors into which circuit cards are inserted and interface with various specific customer telephone lines 23. A number of such line card banks can be included, depending upon the desired overall configuration and capacity of the terminal.

Figure 2:
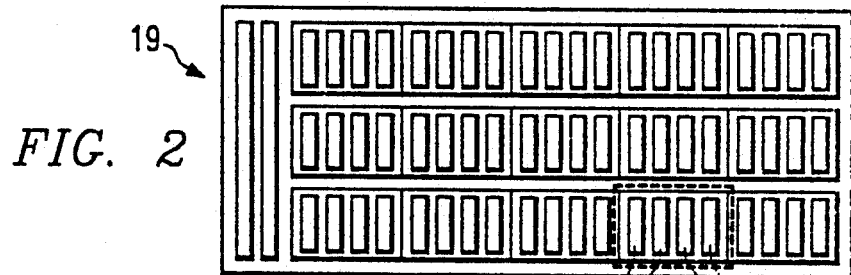
FIG. 2 shows a backplane of a large number of circuit card slots.
Figure 3:
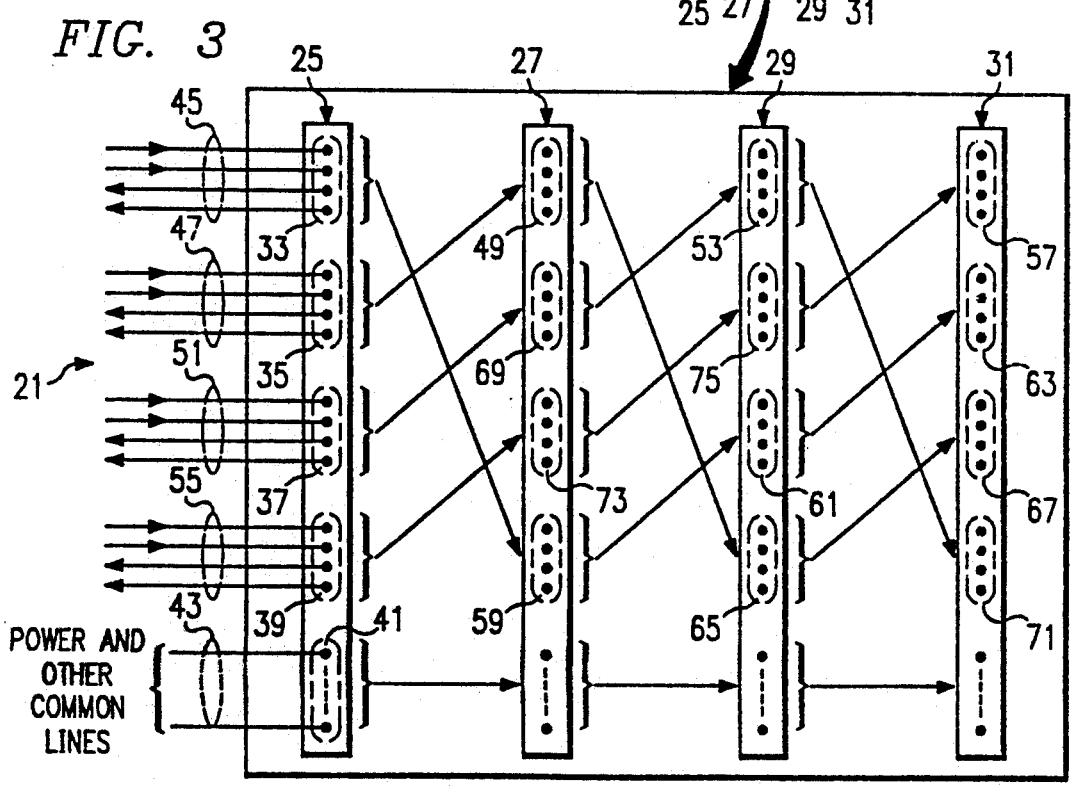
FIG. 3 is an enlarged view of four adjacent circuit card slots of FIG. 2.

FIG. 2 illustrates one such line card bank 19. In this specific example, the bank 19 contains 60 individual card slot connectors, such as slot connectors 25, 27, 29 and 31, each of which will accept a circuit card for interfacing with one or more subscriber telephone circuits of the customer lines 23. The card slot connectors are connected with the buses 21 in repetitive groups of four card slots. The interconnection of one such group with the buses 21 is illustrated in FIG. 3.

Each of the line card slot connectors includes, in the same relative position in each, a group of conductors which is connected to a primary one of the buses 21. For the line card slot connector 25, there is a primary group of conductors 33. A secondary group of conductors 35 is spaced apart from the primary group. In this example, two additional secondary groups 37 and 39 of bus conductors are provided as part of each connector. Finally, each card connector contains a number of additional conductors, indicated at 41 for connector 25, to which various power and common lines 43 are connected in order to supply the circuit card with power, status, control, and other common circuits that the circuit cards require for operation.

The primary group of conductors for each card connector is connected to a separate one of the buses 21. In the four adjacent line card slots illustrated in FIG. 3, bus 45 is connected with the primary group of connectors 33 for the connector 25. A separate bus 47 is connected with a primary group of conductors 49 of he connector 27. Similarly, yet another bus 51 is connected to a primary group of conductors 53 of the connector 29. Finally, in this specific example, another bus 55 is connected with a primary group of conductors 57 of the connector 31.

As a result, the circuit cards have a group of conductors positioned as part of edge connectors for contacting any card slot connector's primary group of conductors. The circuit card is then electrically connected to one of the buses 21 with which no other circuit card can be connected through the primary connector conductors. This allows each circuit card to have first call on the communication channels carried by the bus connected to its card slot's primary group of conductors. The number of channels carried by each bus is made sufficient for most customer line requirements, so as to supply all that is necessary for most circuit cards, but not so many as to provide excess bus channel capacity that is unused in most cases.

Therefore, as a result, there will be customer applications that require a number of telephone channels that exceed that bandwidth of a single bus. For these applications, one or more groups of secondary conductors (in this example, three additional groups) are provided in each card connector for communicating between the card and a bus other than that card slot's primary bus. In order to avoid having a unique, dedicated bus for each of the secondary groups of circuit slot conductors, the secondary groups of bus conductors of each slot are connected with a primary conductor bus of another slot. As a result, the card connected to a bus through its secondary group of conductors has available for its use any number of communication channels of that secondary bus that are not being used by the circuit card for which that bus is its primary bus.

Referring again to FIG. 3, such a system is illustrated in some detail. The bus 45, a primary bus for the card slot connector 25, is also connected with a secondary group of conductors 59 of the slot connector 27, a group 61 of the slot 29, and a group 63 of the slot connector 31. The second bus 47, a primary one for the slot connector 27, also connected to the secondary group of terminals 35 of the slot connector 25, a group 65 of the slot connector 29, and a group 67 of the slot connector 31. Similarly, the bus 51, being the primary bus of the slot connector 29, is connected with the secondary group 37 of the slot connector 25, a secondary group 69 of the slot connector 27, and a secondary group of conductors 71 of the slot connector 31. Finally, the fourth bus 55 in this group, in addition to being the primary bus for the slot connector 31, is also connected with the secondary group of conductors 39 of slot connector 25, a secondary group 73 of slot connector 27, and a secondary group 75 of the slot connector 29. Every group of four adjacent circuit card slot connectors of the linecard bank 19 is similarly connected with a different four of the buses 21.

Thus, each card slot connector provides access to a unique primary bus, plus any leftover capacity of three other buses. Each of the cards first uses the channels of its primary bus, then that of the secondary bus connected to the group of terminals immediately adjacent the primary group of terminals, and as additional capacity is required, then available channels of the third and fourth secondary buses as well. Each of the buses is connected with only one of each level of secondary groups of conductors in order that the additional channels required by any circuit card is distributed among the various buses and not likely to be concentrated on any one bus.

Specific parameters for an example of the terminal being described will now be outlined. The optical fiber trunk line 13 has a capacity of carrying approximately 2016 channels in each of two fiber trunk interfaces, for a total of 4032 channels. Each of the buses 21 is provided with 24-29 communication channels, depending upon configuration, plus signaling and overhead channels. Nine line card banks, each bank containing 60 circuit card connectors, are utilized, thus providing the total of 540 line card connectors and thus 540 separate buses 21. Only 168 buses of such a bandwidth can carry all the channels of the fiber optic trunk line to circuit cards but the additional buses provides the capacity necessary to be able to efficiently connect with a large number of circuit cards that require only a few channels each of capacity.

Figure 4:
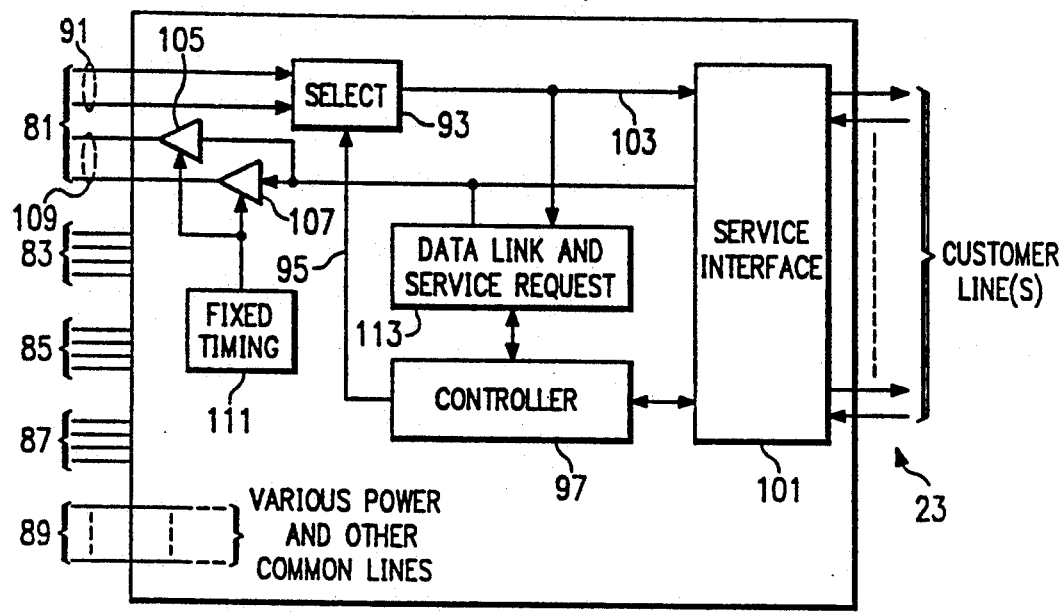
FIG. 4 shows a circuit card of one type.

The 24-29 communication channels of each of the buses 21 essentially equals the capacity of a standard 24 channel T1 telephone circuit (also referred to as a DS1 circuit). Thus, a circuit card of a type illustrated in FIG. 4 can interconnect with such a customer circuit, or one requiring fewer communication channels, by interconnecting with only the primary bus of the slot in which the card is inserted. Other standard customer circuits include DDS data and ISDN types. A group of primary conductors 81 on an edge connector of the circuit card of FIG. 4 are positioned to contact a primary group of conductors of any of the card slots provided in the line card banks. Additional groups of conductors 83, 85 and 87 are provided as part of the edge connector for connecting with the secondary conductors of the line card connectors, but they are not utilized in this instance. Another group of conductors 89 connects with the various power and common circuit card lines that are connected to a bottom group of conductors of a line card connector.

As another feature of the example terminal being described, each of the buses 21 is provided with a pair of primary transmit and receive conductors, plus a backup secondary pair which can be utilized in case of failure of the first pair or its associated circuitry. The conductors 91 are two receive conductors, one of which is selected by a switching circuit 93 in response to a control signal in the line 95 from a controller circuit 97. The selected receive line 91 is directed to the appropriate customer line or lines 23 through appropriate interface circuitry 101.

Conversely, signals being transmitted on the customer lines pass through the service interface circuitry 101, and then along conductor 103 to the inputs of two switchable drivers 105 and 107. The interface 101 may contain analog-to-digital and digital-to-analog conversion circuits for interfacing with voice frequency customer circuits. The outputs of these drivers are applied to respective conductors 109 for connection with the transmit conductor of each of the primary and secondary circuits of the primary bus of the connector in which the circuit card is positioned. The drivers 105 and 107 are gated on and off by a timing circuit 111. Each such card is gated by the circuits 111 to transmit signals in specific, fixed of the 24-29 time slots of the interconnecting primary bus. This can be done since there is only one primary bus connected to each card slot connector. If the customer lines require only two communication channels, for example, a card of the type of FIG. 4 adapted to interface with such a customer circuit is provided with a timing circuit 111 that inserts signals in two fixed specified bus time slots in the transmit conductors 109. Similarly, for a card adapted to provide four communication channels, the timing 111 of that card is set to transmit the four channels in four specified bus time slots.

In addition to the 24-29 communication channels carried by each of the buses 21, an additional two time slots are provided for communicating data and service requests between the control system 11 of a terminal and the individual circuit cards. Thus, a circuit 113 is connected to receive such control signals on the overhead bus time slot from the output of the selector 93, and to insert such signals therein through conductor 103. Such control signals are communicated with the controller 97 with which the circuits 113 are interconnected.

Figure 5:
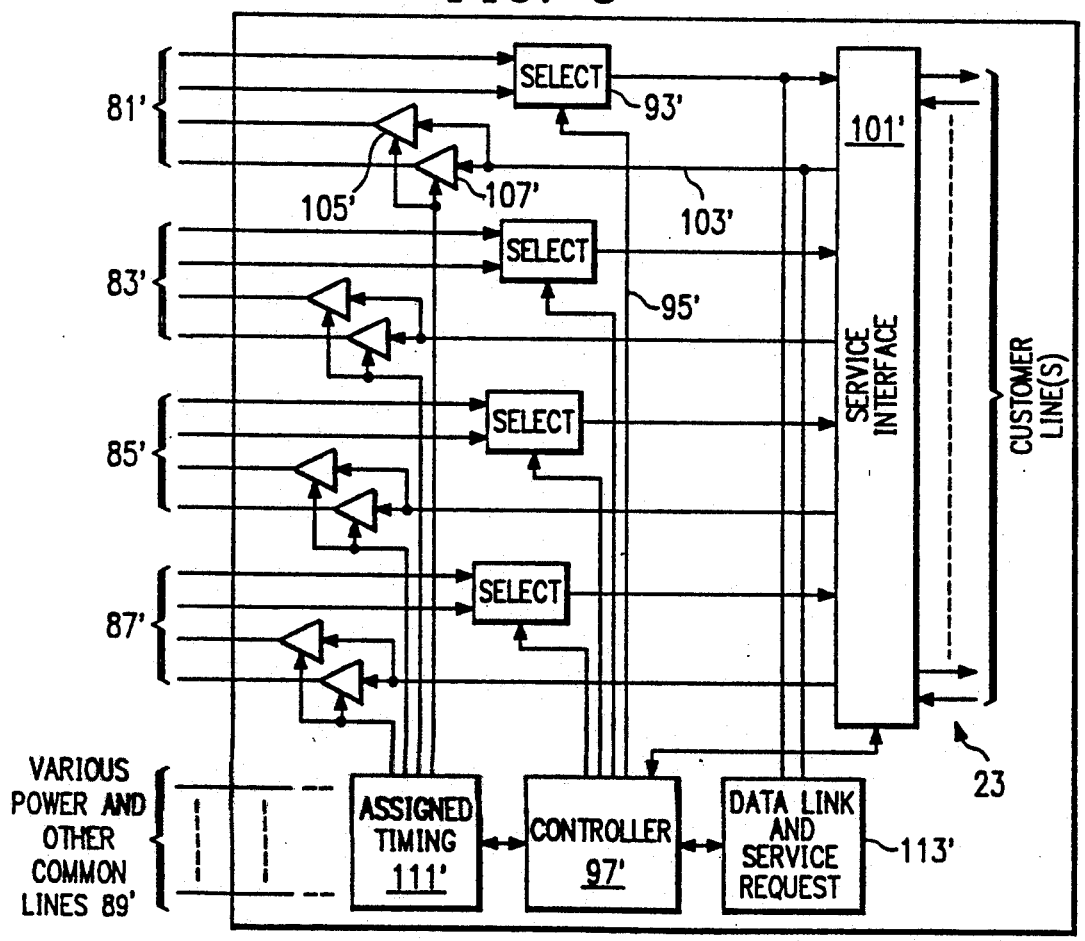
FIG. 5 shows a circuit card of another type.

Referring to FIG. 5, a circuit card adapted to supply customer lines 23 requiring more than the 24-29 channel capacity of one of the buses 21 is illustrated by use of the same reference numbers to identify portions that correspond to the circuit card of FIG. 4, but with a prime (') added. The main difference is that in addition to circuits provided for communicating with the primary bus line of a card slot in which the card is inserted, through conductors 81', similar circuitry is provided for each of the secondary group of conductors 83', 85' and 87'. All of the communication channels made available through any of the four groups of pins are interfaced through circuits 101' with the customer circuits.

A difference in the card of FIG. 5 is with respect to the timing circuits 111'. The timing can not be fixed in the secondary bus connections since those buses also serve as primary buses of other cards. A customer can utilize such unused bus channels for transmission but they need to be specified in each case. This is controlled by signals communicated over the overhead bus channel to the circuits 113' and are acted upon by the controller 97' to set the timing in the circuits 111'.

In the example being described, a circuit card of FIG. 5 can provide a 48-channel customer service, in the form of the DS1C standard or otherwise. This is one-half the capacity of the four buses with which the card is connected. That leaves additional capacity in those buses for use by the other three cards inserted in the group of four connectors illustrated in FIG. 3. However, if all 96 channels are utilized by a card of the type shown in FIG. 5, according to a DS2 standard or otherwise, the entire capacity of a group of four buses will be consumed. In this case, no other cards can be inserted into a group of four card slots of FIG. 3 in which such a card in inserted.

It will be recognized that the system described provides great flexibility in giving a particular customer the communication channels that are required without wasting capacity. The configuration described provides considerable flexibility in bandwidth assignment and allocation.

Although the various aspects of the present invention have been described with respect to a preferred embodiment thereof, it will be understood that the invention is entitled to protection within the full scope of the appended claims.

It is claimed:

1. A communications terminal, comprising:
    means for connecting to a fiber optic communications link having a capacity of a first number of communication channels,
    means connected with said fiber optic communications link connecting means for selectively connecting various of said communication channels to a plurality of electrical buses that individually have a maximum capacity of a second number of communication channels less than said first number,
    a plurality of circuit cards,
    a plurality of connectors for individually receiving one of the plurality of circuit cards, each of said plurality of connectors having at least first and second similarly positioned groups of conductors for electrical connection with one of the plurality of circuit cards, the first group of conductors of each of said plurality of connectors being connected with different ones of said plurality of electrical buses, and the second group of conductors of each of said plurality of connectors also being connected with different ones of said plurality of electrical buses, those of the plurality of electrical buses connected to the first group of conductors of one of the plurality of connectors also being connected to the second group of conductors of a different one of the plurality of connectors, and
    said plurality of subscriber circuit cards individually having at least a first group of card conductors for connection with said first group of conductors of a connector into which it is received, said circuit cards including means connected to at least said first group of card conductors for interconnecting with subscriber communications equipment.

2. The communications terminal according to claim 1 wherein at least one of said plurality of circuit cards includes an interconnecting means that is connected to a bus only through said first group of card conductors, whereby a maximum of said second number of communication channels are provided the subscriber through said at least one card.

3. The communications terminal according to claim 1 wherein at least one of said plurality of circuit cards includes a second group of card conductors for connection with said second group of conductors of a connector into which it is received, said at least one card additionally having an interconnecting means that includes means additionally connected to said second group of card conductors for interconnecting with the subscriber equipment, whereby a number of the communications channels in excess of said second number are provided to the subscriber through said at least one card.

4. The communications terminal according to claim 2 wherein said circuit card interconnecting means of said at least one circuit card additionally includes means for selecting a certain set of said second number of channels to be connected between said first group of card conductors and said subscriber communications equipment.

5. The communications terminal according to any one of claims 1-3 wherein the second number of communication channels is within a range of approximately 24 to 29, inclusive.

6. The communications terminal according to claim 1 wherein the first number of communication channels is approximately 4032, the second number of communication channels is within a range of approximately 24-29, and the number of buses exceeds 168.

7. The communications terminal according to claim 2 wherein said subscriber communications interconnecting means on said at least one circuit card being capable of connecting with one of a DDS data, analog voice frequency, ISDN or DS1 type of subscriber communications equipment.

8. The communications terminal according to claim 3 wherein said subscriber communications equipment interconnecting means on said at least one circuit card being capable of connecting with one of a DS1C or DS2 type of subscriber communications equipment.

9. The communications terminal according to claim 1 wherein said plurality of connectors are arranged in a plurality of banks wherein each bank includes approximately 60 connectors.

10. The communications terminal according to any one of claims 1-3 wherein each of said electrical buses includes a pair of receive circuits and a pair of transmit circuits, and further wherein the subscriber circuit cards includes means for selecting one of the pair of receive circuits to be connected with said subscriber equipment interconnection means.

11. A communications terminal for interconnecting a fiber optic communications link having a capacity of a first number of communication channels with a plurality of subscriber communication circuits, comprising:
    means connected with said fiber optic communications link for selectively connecting various of its said communication channels to a plurality of electrical buses that individually have a maximum capacity of a second number of communication channels less than said first number,
    a plurality of circuit cards,
    a plurality of connectors for individually receiving one of said circuit cards, each of said plurality of connectors having first, second, third and fourth similarly positioned groups of conductors for connection with a circuit card, individual ones of the plurality of buses being connected with each of the first, second, third and fourth groups of connector conductors of different connectors, and
    said plurality of circuit cards individually including at least a first group of card conductors for connection respectively with said first group of connector conductors of a connector into which it is received, said circuit cards including means connected to at least said first group of connector conductors for interconnecting with a subscriber communications circuit.

12. The communications terminal according to claim 11 wherein said plurality of buses are connected in groups of four to the groups of conductors of four connectors that are positioned immediately adjacent one another.

13. The communications terminal according to claim 11 wherein at least one of said plurality of circuit cards includes an interconnecting means that is connected to a bus only through said first group of card conductors, whereby a maximum of said second number of communication channels are provided to the subscriber communications circuit through said at least one card.

14. The communications terminal according to claim 11 wherein at least one of said plurality of circuit cards additionally includes an interconnecting means having means additionally including at least a second group of card conductors connected to said second group of connector conductors for interconnecting with the subscriber communications circuit, whereby a number of channels in excess of said second number are provided to the subscriber through said at least one of said plurality of circuit cards.

15. The communications terminal according to claim 11 wherein at least one of said plurality of circuit cards additionally includes an interconnecting means means additionally connected to second, third and fourth groups of card conductors for interconnecting respective second, third and forth groups of conductors with the subscriber communications circuit, whereby a number of channels in excess of said second number are provided to the subscriber through said at least one card.

16. The communications terminal according to any one of claims 11-15 wherein each of said electrical buses includes a pair of receive circuits and a pair of transmit circuits, and further wherein the plurality of circuit cards includes means for selecting one of the pair of receive circuits to be connected with said subscriber communications circuit interconnection means.

17. The communications terminal according to any one of the claims 11-15 wherein the second number of communication channels is within a range of approximately 24 to 29, inclusive.

18. A communications terminal for interconnecting a fiber optic communications link having a capacity of a first number of communications channels with a plurality of subscriber communication circuits, comprising:
    means connected with said fiber optic communications link for selectively connecting various of said communication channels to a plurality of electrical buses that individually have a maximum capacity of a second number of communication channels less than said first number,
    a plurality of connectors that each include a fixed number of similarly positioned groups of conductors, individual ones of said groups of conductors being connected to only one of said plurality of electrical buses, said plurality of connectors being arranged in functional groups of a number of connectors equal to said fixed number, each connector within individual of said functional groups of connectors having each of its groups of conductors connected to a different one of a group of said plurality of electrical buses equal to said fixed number, each of said similarly positioned group of conductors of the connectors in each such functional group being connected to a different one of said plurality of electrical buses, and a plurality of circuit cards that each include a card connector that mates with one of the plurality of connectors, said cards individually including electronic circuit means operably connected with said card connector for connecting to at least one of said customer communications circuits.

19. The communications terminal according to claim 18 wherein said fixed number is equal to four.

* * * * *